2,893,995
STABILIZATION OF VINYLPYRIDINES

John E. Mahan, Bartlesville, Okla., assignor to Phillips Petroleum Company, a corporation of Delaware No Drawing. Application March 30, 1953
Serial No. 345,730

10 Claims. (Cl. 260—290)

This invention relates to a process for inhibiting polymerization during the separation and processing of vinyl-substituted heterocyclic compounds having a hetero nitrogen atom. In one of its aspects this invention relates to the stabilization of vinylpyridine compounds.

In the processing of vinylpyridine and other vinyl-substituted heterocyclic nitrogen compounds by various means, including distillation, polymerization occurs which manifests itself in two ways. Soluble polymers are formed which are evidenced by an increase in viscosity, and ultimately, by forming a solid mass. Also formed are insoluble polymers, referred to herein as popcorn polymer. The popcorn polymer is insoluble in the vinylpyridine and other organic compounds, and when in contact with a monomer, continues to grow. This problem is particularly acute in the manufacture and processing of vinyl-substituted pyridines because vinylpyridines are themselves used as monomers in polymerization reactions. Popcorn polymer accumulates or grows very rapidly in distillation processes, reesulting in the loss of valuable material and causing pipes, condensers and equipment to be clogged.

I have discovered that the addition product formed by the introduction of oxides of nitrogen into a tertiary amine is an effective inhibitor against the formation of soluble polymer and popcorn polymer in vinyl-substituted heterocyclic compounds having a hetero nitrogen atom. The novel inhibitors herein disclosed will be effective and generally applicable to all operations wherein vinyl-substituted heterocyclic nitrogen monomeric compounds are handled, or processed, particularly under the severe conditions of distillation, and the result of their use is that polymerization can be prevented. The oxides of nitrogen, which I have found to form addition products with tertiary amines, are oxides of nitrogen selected from the group consisting of nitric oxide, nitrogen dioxide and nitrogen trioxide. These oxides of nitrogen will form an addition product with any tertiary amine, said addition product being the novel stabilizing agent and inhibitor of my invention.

In accordance with this invention, one method of operation comprises the introduction of one of the above mentioned oxides of nitrogen into a tertiary amine, such as pyridine, alkyl-substituted pyridine or vinyl-substituted pyridine, and the addition product which is formed is then employed for inhibiting polymerization in a vinyl-substituted heterocyclic nitrogen compound, e.g., in a vinyl-substituted pyridine. Other tertiary amines to which my invention is applicable are the trialkylamines, dialkylarylamines, dialkylcycloalkylamines, dialkylaralklyamines, and examples of these are trimethylamine, triethylamine, N,N-dimethylaniline, N,N-dimethylcyclohexylamine, and N-methyl-N-ethylbenzylamine. The reaction between the oxide of nitrogen and the tertiary amine is generally preferred to be effected at a temperature in the range from 50° to 150° F., although higher or lower temperature can be employed, if desired. That a true addition compound is formed of the oxides of nitrogen and a tertiary amine was shown by a distillation of such an addition compound of 1.8 weight percent nitrogen dioxide and 2-methyl-5-vinylpyridine. 95 volume percent of said 2-methyl-5-vinylpyridine was distilled overhead, at 10 mm. Hg absolute pressure before the presence of nitrogen dioxide was detectable in the overhead product. The inhibitor thus prepared can be utilized by introducing it into the liquid vinylpyridine compounds prior to processing steps, such as distillation, to effect separation and recovery of pure monomers.

Another method of operation in accordance with my invention comprises the preparation in situ of the inhibitor from an oxide of nitrogen and a tertiary amine, which can be itself a monomer desired to be stabilized and processed. Where this method is followed controlled quantities of the desired nitrogen oxide can be passed into the tertiary amine monomer-containing streams prior to or during the processing or fractionating steps. The addition product, which is the novel inhibitor against polymerization, is thus formed in the system.

When preparing the inhibitors of this invention, it is generally preferred that an excess of the tertiary amine base be present. The proportions of the reactants will preferably be adjusted so that the inhibitor is an addition compound of 1 percent to 20 percent by weight of the oxide of nitrogen with the remainder being the tertiary amine base. In some instances it may be desired to employ larger quantities of the oxide of nitrogen, it being considered that the maximum will be a 1:1 mole ratio of the oxide of nitrogen to the tertiary amine base. For example, an addition compound formed of a 1:1 mole ratio of nitrogen dioxide to pyridine would contain 36.8 percent by weight of the oxide of nitrogen. In any event, regardless of the proportion of the combined oxide of nitrogen in the inhibitor addition compound, I have found that satisfactory inhibition of polymerization in vinylpyridine monomers can be effected when the inhibitor is employed in such quantities that the amount of the combined oxide of nitrogen in the process stream containing the vinyl-substituted heterocyclic nitrogen compounds is in the range of from 0.01 to 5.0 percent by weight based on the weight of the monomeric material to be stabilized. When it is desired to prepare the polymerization inhibiting addition compound in situ, the quantity of the oxide of nitrogen to be introduced into the process stream should be adjusted to give an amount of the combined oxide of nitrogen within the above stated ranges of concentration, i.e., from 0.01 percent to 5.0 percent by weight.

While the addition compound inhibitors have been described in the foregoing as being formed from one oxide of nitrogen and one tertiary amine base, it is to be understood that a mixture of oxides of nitrogen and a mixture of tertiary amine bases can be used. While an addition compound thus formed will be an effective stabilizing agent against polymerization in any vinylpyridine monomer, it is frequently preferred to prepare addition compounds using tertiary amine base compounds similar to those vinylpyridine compounds in which the inhibitors are to be employed. For example, if it is desired to inhibit polymerization in 2-methyl-5-vinylpyridine, it is frequently preferred to prepare the addition compound inhibitor from an oxide of nitrogen and a similar tertiary amine, such as 2-methyl-5-ethylpyridine or 2-methyl-5-vinylpyridine.

The addition compounds of this invention of the oxides of nitrogen and tertiary amines, have been found to be effective in inhibiting polymerization in vinyl-substituted pyridines. One group of such compounds which can be stabilized in accordance with my invention is the mono- and divinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4 - vinylpyridine; 2,5 - divinylpyridine; 2-methyl-5-vinylpyridine; 2-vinyl-5-ethylpyridine; 2,3,4-trimethyl-5-vinylpyridine; 3,4,5,6 - tetramethyl-2-vinylpyridine; 3-ethyl-5-vinylpyridine; 2,6-diethyl - 4 - vinylpyridine; 2-isopropyl-4 - nonyl-5-vinylpyridine; 2-methyl - 5 - undecyl-3-vinylpyridine; 3-dodecyl - 4,5 - divinylpyridine; 2,4-dimethyl-5,6-dipentyl-3-vinylpyridine; 2-decyl - 5 - (alpha-methylvinyl)pyridine; 3,5-di(alphamethylvinyl)pyridine; and the like.

Other polymerizable heterocyclic nitrogen compounds included within the scope of this invention are those vinyl and alpha-methylvinyl-substituted heterocyclic nitrogen compounds in which the ring structure is unsaturated, partially saturated and completely saturated. Examples include vinyl and alpha-methylvinyl-substituted quinolines, isoquinolines, piperidine (hexahydropyridines), pyrroles, pyrrolidines, pyrrolidones, dihydro and tetrahydropyridines, partially hydrogenated quinolines and isoquinolines, pyrrolines (dihydropyrroles), and alkyl derivatives of the foregoing compounds. Examples of such compounds are 2-vinylquinoline; 8-ethyl - 2 - vinylquinoline; 4-hexyl-5-vinylquinoline; 1-vinylisoquinoline; 5-methyl - 1 - isopropenylisoquinoline; 1,8 - divinylisoquinoline; vinylpyrrolidone; vinylpyrrole; vinylpiperidine; and vinylpyrrolidine and the like. Normally the vinyl substituent will be attached to a ring carbon atom. However in compounds wherein the ring nitrogen atom is a secondary nitrogen atom the vinyl group can instead be attached to this ring nitrogen atom, for example, N-vinylcarbazole and N-vinylpyrrolidone. The process of this invention is particularly applicable to organic or hydrocarbon mixtures containing a substantial proportion of a vinylpyridine compound, i.e., that amount which causes difficulties due to its polymerization, e.g., over 50 percent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-amyl-2-vinylpyridine.

The inhibitors of this invention are effective not only in systems containing the above-mentioned vinyl-substituted pyridines, but are also applicable and effective to inhibit polymerization when other materials which have a tendency to initiate polymerization such as divinylbenzene, as well as alkylpyridines, are present with the vinyl-substituted heterocyclic nitrogen compounds.

The following examples are illustrative of my invention, but are in no sense limitative thereof.

Example I

A sample of 2-methyl-5-vinylpyridine containing 5 percent by weight of water and 0.3 percent by weight of divinylbenzene was heated at a temperature of 185° F., in contact with steel, iron oxide and air. After four hours the sample was substantially completely converted to a solid mass comprising insoluble popcorn polymer and soluble polymer.

Nitrogen dioxide was passed into 2-methyl-5-vinylpyridine until a composition containing 3 weight percent nitrogen dioxide was obtained. The addition compound thus formed was added to 2-methyl-5-vinylpyridine containing water and divinylbenzene in sufficient amount that the mixture contained 94.6 weight percent 2-methyl-5-vinylpyridine, 5 weight percent water, 0.3 weight percent divinylbenzene and 0.1 weight percent nitrogen dioxide. The mixture was heated at 185° F. in contact with steel, iron oxide and air and there was no evidence of polymerization after 28 days.

Example II

Six tests were made in which the severity of conditions for the formation and growth of popcorn polymers was increased by adding to the 2-methyl-5-vinylpyridine popcorn polymer seed from different sources. The inhibitor utilized was an addition compound composed of 3 weight percent nitrogen dioxide in 2-methyl-5-vinylpyridine. This inhibitor was added to the vinyl-substituted pyridine monomer to produce a concentration of nitrogen dioxide in the total sample of 0.1 weight percent. With each test a control sample was observed with the same composition, but without the presence of the inhibitor. In each test there was an air atmosphere over the sample and the mixture was heated in a sealed glass tube. The method for determining the amount of popcorn polymer formed consisted in measuring the vertical linear growth of the insoluble popcorn polymer mass and expressing the measurement as a percentage of the total distance from the bottom of the sample tube to the liquid level. The following table gives the conditions of the tests, compositions tested and the results obtained.

| | 1 | 2 | 3 | 4 | 5 | 6 |
|---|---|---|---|---|---|---|
| Liquid monomer composition | 95 weight percent 2-methyl-5-vinylpyridine, 5 weight percent water | | | | 99 plus, weight percent 2-methyl-5-vinylpyridine | |
| Liquid volume, ml | 20 | 20 | 20 | 20 | 40 | 40. |
| Test temperature, °F | 185 | 185 | 185 | 185 | 75 | 122. |
| Duration of test, days | 10 | 10 | 13 | 10 | 18 | 18. |
| Popcorn growth, inhibitor present | No growth | No growth | No growth | No growth | No growth | No growth. |
| Popcorn growth, inhibitor absent | 70% in 16 hours. | 100% in 4 hours. | 70% in 24 hours. | 100% in 16 hours. | 30% in 96 hours. | 30% in 24 hours. |

The popcorn polymer seeds which were added to tests 1 and 2 were prepared by adding 0.3 weight percent divinylbenzene to 2-methyl-5-vinyl-pyridine and heating at 185° F. The popcorn seeds formed were boiled for five minutes in benzene to remove soluble polymer and then filtered and dried before use. The popcorn polymer seeds which were added to test 3 were prepared by heating a mixture containing 85 weight percent 2-methyl-5-vinylpyridine, 5-weight percent butadiene, 10 weight percent water and a small amount of benzoyl peroxide at 130° F. in the presence of steel and iron oxide. Conversion to popcorn polymer started after 19 days and was complete after 21 days. The popcorn polymer seeds for test 4 were prepared by heating a mixture composed of 88.8 weight percent styrene and 11.2 weight percent butadiene at 130° F. in an evacuated tube for 10 days, when conversion to popcorn polymer was complete. The popcorn polymer seeds for tests 5 and 6 were obtained from popcorn polymer spontaneously produced in a pilot plant distillation column in which a mixture containing a major proportion of 2-methyl-5-vinylpyridine was being fractionated.

As is shown by Example II, popcorn polymer growth in the vinylpyridine monomeric compounds was rapid and this growth was successfully inhibited by the use of the inhibitor in accordance with this invention. This result is notable because the samples were seeded with active popcorn polymer and the inhibitor was effective to prevent growth of these active seeds as well as the spontaneous formation of popcorn polymer.

Example I illustrates, additionally, the effectiveness of the inhibitors of this invention to prevent soluble polymer formation, since after 28 days no observable polymerization had occurred. The inhibition of polymerization effected in accordance with this invention will be satisfactory at temperatures up to 400° F.

In the practice of this invention the polymerization inhibiting compounds disclosed herein can be used, for example, in the following manner. In the preparation of 2-methyl-5-vinylpyridine from 2-methyl-5-ethylpyridine by dehydrogenation, the principal separation is a combined steam and vacuum distillation to make a separation between 2-methyl-5-ethylpyridine and 2-methyl-5-vinylpyridine. This separation is difficult because of the rapid polymerization of 2-methyl-5-vinylpyridine. After a short period of time, operation of the column becomes impossible because of the formation of popcorn polymer and soluble polymer in the fractionating column and in the kettle. However, by the use of an addition compound, as disclosed herein, composed of an oxide of nitrogen and a tertiary amine, shut-downs due to the formation of polymer can be eliminated. The practical limits on the amount of the polymerization inhibiting addition compound which can be effectively used is from 0.01 percent to 5.0 percent by weight of combined oxide of nitrogen based on the weight of the vinyl-substituted heterocyclic nitrogen compound to be stabilized. A preferred range of concentration of the combined oxide of nitrogen, stated in similar units, is from 0.05 percent to 1.0 percent by weight. As is apparent from the foregoing examples, a concentration of 0.1 percent by weight of the oxide of nitrogen was satisfactory to inhibit polymerization in 2-methyl-5-vinylpyridine at temperatures ranging from 75° to 185° F.

It will be understood that the foregoing disclosure is illustrative and that other embodiments within the scope of the invention will occur to those skilled in the art.

I claim:

1. A method for inhibiting the polymerization of a vinyl-substituted pyridine which comprises, adding to said pyridine during distillation from 0.01 percent to 5.0 percent by weight based on the weight of the vinyl-substituted pyridine of an oxide of nitrogen selected from the group consisting of nitric oxide, nitrogen dioxide, and nitrogen trioxide, thereby forming an addition compound of said oxide of nitrogen and said pyridine in situ.

2. A method for inhibiting the polymerization of 2-methyl-5-vinylpyridine during distillation which comprises, introducing into said 2-methyl-5-vinylpyridine from 0.01 percent to 5.0 percent by weight based on the weight of said 2-methyl-5-vinylpyridine of an addition compound of an oxide of nitrogen and a tertiary amine, said oxide of nitrogen selected from the group consisting of nitric oxide, nitrogen dioxide, and nitrogen trioxide, and said tertiary amine being selected from the group consisting of pyridine, alkyl-substituted pyridine, and vinyl-substituted pyridine.

3. A method for inhibiting during distillation the polymerization of heterocyclic nitrogen compounds selected from the group consisting of compounds having the formula

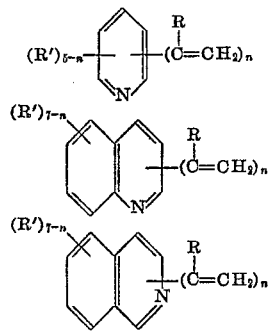

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, which comprises introducing into said heterocyclic nitrogen compounds an inhibiting amount of an addition product of an oxide of nitrogen and a tertiary amine, said oxide of nitrogen being selected from the group consisting of nitric oxide, nitrogen dioxide, and nitrogen trioxide, and said tertiary amine being selected from the group consisting of pyridine, alkyl-substituted pyridine and vinyl-substituted pyridine.

4. A polymerizable heterocyclic nitrogen base selected from the group consisting of compounds having the general formula

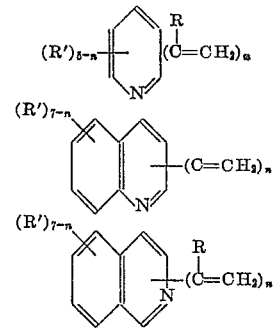

wherein $n$ is an integer selected from the group consisting of 1 and 2, R is selected from the group consisting of H, $CH_3$ and $C_2H_5$, and each R' is individually selected from the group consisting of H and an alkyl group, not more than 12 carbon atoms being present in the total of said R' groups, said heterocyclic base being stabilized by the addition of a stabilizing amount of an addition product composed of an oxide of nitrogen selected from the group consisting of nitric oxide, nitrogen dioxide and nitrogen trioxide and a tertiary amine selected from the group consisting of pyridine, alkyl-substituted pyridine, and vinyl substituted pyridine.

5. A method for inhibiting during distillation a polymerizable vinyl-substituted pyridine with an inhibiting amount of an addition product of an oxide of nitrogen selected from the group consisting of nitric oxide, nitrogen dioxide, and nitrogen trioxide and a tertiary amine selected from the group consisting of pyridine, alkyl-substituted pyridine, and vinyl-substituted pyridine.

6. A polymerizable vinyl-substituted pyridine stabilized by the addition of a stabilizing amount of an addition product composed of an oxide of nitrogen selected from the group consisting of nitric oxide, nitrogen dioxide, and nitrogen trioxide and a tertiary amine selected from the group consisting of pyridine, alkyl-substituted pyridine, and vinyl-substituted pyridine.

7. The composition of claim 6 wherein said addition compound contains from about 0.01 percent to about 5.0 percent by weight of said oxide of nitrogen based on the weight of said polymerizable vinyl-substituted pyridine.

8. The method of claim 3 wherein said addition compound contains from about 0.01 percent to about 5.0 percent by weight of said oxide of nitrogen based on the weight of said heterocyclic nitrogen compounds.

9. A 2-methyl-5-vinylpyridine stabilized with about 0.01 to about 5.0 weight percent of an addition compound of an oxide of nitrogen and a tertiary amine, said oxide of nitrogen being selected from the group consisting of nitric oxide, nitrogen dioxide, and nitrogen trioxide and said tertiary amine being selected from the group consisting of pyridine, alkyl-substituted pyridine, and vinyl-substituted pyridine.

10. A 2-methyl-5-vinylpyridine stabilized with about 0.01 to about 5.0 weight percent of nitrogen dioxide based on the weight of 2-methyl-5-vinylpyridine, said nitrogen dioxide forming an addition product with said 2-methyl-5-vinylpyridine in situ.

References Cited in the file of this patent
UNITED STATES PATENTS

| | | |
|---|---|---|
| 2,402,806 | Durland | June 25, 1946 |
| 2,512,660 | Mahan | June 27, 1950 |
| 2,556,845 | Kauffman | June 12, 1951 |

OTHER REFERENCES

Frank et al.: J.A.C.S., vol. 68, p. 908 (1946).
Kluchesky et al.: J. Indust. and Eng. Chem., vol. 41, pp. 1768–71 (1949).
Devins et al.: Chem Abstracts, vol. 42, pp. 5704–5 (1948).